Sept. 18, 1951  G. A. MATTESON, JR  2,568,242
ELECTRICAL CONTACT
Filed Nov. 8, 1948

INVENTOR.
GEORGE A. MATTESON, JR.
BY
Townsend M. Gunn.
Attorney.

Patented Sept. 18, 1951

2,568,242

UNITED STATES PATENT OFFICE 2,568,242

ELECTRICAL CONTACT

George A. Matteson, Jr., Providence, R. I., assignor to Metals and Controls Corporation, Attleboro, Mass., a corporation of Massachusetts Application November 8, 1948, Serial No. 58,928

6 Claims. (Cl. 200—166)

This invention has to do with electrical contacts and with regard to certain more specific features, to electrical contacts of the rivet type.

Among the several objects of the present invention may be noted the provision of a novel type of composite contact having a head with a shank attached thereto; the provision of a composite contact in which the shank of the contact carries the means of attaching the shank to the head; the provision of a new and useful method of attaching a head to a shank by means of soldering or brazing which minimizes the tendency of the soldering or brazing element to spread beyond a predetermined boundary; and the provision of a contact and method of making it which are economical, simple, and adapted to mass production. Other objects will be in part obvious and in part pointed out hereinafter.

The invention accordingly comprises the elements and combinations of elements, steps and sequence of steps, features of construction, and arrangement of parts, which will be exemplified in the accompanying drawings, and the scope of the application of which will be indicated in the following claims.

In the accompanying drawings, in which is illustrated one of several possible embodiments of the invention:

Similar reference characters indicate corresponding parts throughout the various views in the drawings.

Figure 1:
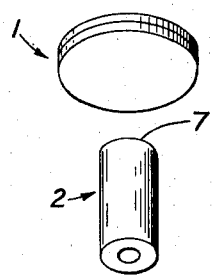
Fig. 1 is an exploded perspective view, prior to assembly of the parts forming the complete contact, to show the relation of the parts to each other.
Figure 2:
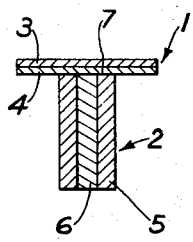
Fig. 2 is a cross-sectional view of the contact of this invention, assembled and ready for a heating operation.
Figure 3:
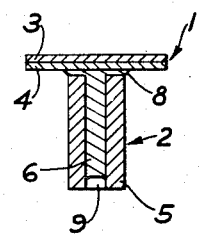
Fig. 3 is a view similar to Fig. 2, but showing the cross-section of the contact after the heating operation.
Figure 4:
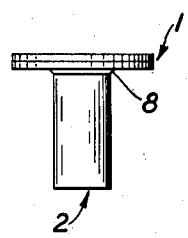
Fig. 4 is a side view of the completed contact.
Figure 5:
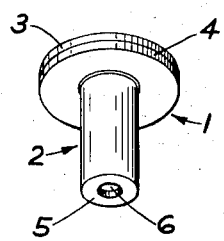
Fig. 5 is a perspective view of the contact of Fig. 1 showing it in its completed form.

In the design and use of electrical make and break contacts of the rivet type, it is often desirable to have a relatively very thin head. Such heads, especially when their diameters are relatively large, are difficut to make on a header machine. It is often desirable, also, to have the heads of the contacts of multi-layer material (for example where it is desired to have a very thin contacting surface of an expensive metal such as platinum, gold, silver, or palladium and a supporting layer of a baser metal) or to have irregularly shaped heads. Contacts having such head are all difficult to make on a header machine.

In such cases as those described above, it has been suggested that the shank of the contact be soldered to the head. This is sometimes difficult to do, because with presently known methods of soldering in which the solder is applied as a powder, or a thin sheet disposed between the head and the shank, the capillary action between the solder and the thin head may tend to cause the molten solder to creep around the edges of the head and flow partially over the upper surface which is to be used in making or breaking an electrical circuit. The presence of solder on the contacting surface may be detrimental to the proper use of the contacts. Furthermore, having to put the solder on separately involves an additional operation which is often difficult, and is not well adapted to mass production.

It is, therefore, the purpose of this invention to provide a rivet-type electrical make and break contact which eliminates the above difficulties in an economical manner, and which lends itself to mass production.

Referring to the drawings and in particular Figures 1-5, there is indicated generally by numeral I a head portion of the contact of this invention, and generally by 2 a body portion or shank therefor. Head I is shown in this instance as being circular and relatively thin, and comprising two layers 3 and 4 of a suitable electrical contact material and a base metal respectively. For example, layer 3 may be of gold, silver, platinum, etc., while layer 4 may be of bronze or copper or some other suitable metal. It is within the scope of this invention to have head I of other than circular shape, such as square, oval, etc., and single-layered. Body portion or shank 2 may also have shapes other than that shown.

Shank 2 is in this instance shown as circular in cross-section, and comprises a tube 5 filled with solder 6 as a core thereof. (Hereinafter this combination will be referred to as a solder-cored shank.)

In the most economical manufacture of the contact, an ingot is prepared having a core of solder. This is then drawn down in the proper wire drawing machinery to give long lengths of wire the desired size and cross-sectional shape for the proposed shanks. The individual shanks 2 are then cut off from the long lengths of wire, and this can advantageously be done on an automatic screw machine in accordance with well-known practice. As cut off, the individual shanks have each a core of solder. The solder-cored shank 2 is cut off, in this instance, with the end 7 that is to be abutted to the under side 4 of head 1, perpendicular to the axis of the shank. End 7 is then placed in physical contact with face 4, and the head and shank are heated until the solder 6 reaches its flowing temperature. When this happens, due to capillary action present between face 4 and end 7, the molten solder will flow outwardly until it has filled the interspace between face 4 and end 7. A slight fillet of solder 8 will probably be formed, and it is at this point that one of the important advantages of the invention is realized, in that the fillet 8 can be controlled substantially as to presence and size by the temperature of soldering, the length of time the solder is allowed to flow, and the size of the core of solder.

Provided excessive heating is not applied to the assembly, once the solder has reached the outer perimeter of end 7, it ceases to flow, and consequently solder does not creep over the contact surface 3 to spoil the contact. The solder 6 in the shank 2 acts as a reservoir of solder during this flowing; that it does so, is indicated by the fact that after the heating and flowing, a section 9 of tube 5 is left substantially empty of solder as shown.

Figure 6:
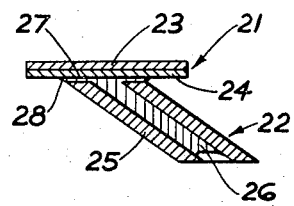
Fig. 6 is a cross-sectional view of a different embodiment of the invention.
Figure 7:
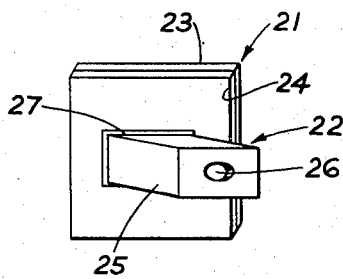
Fig. 7 is a perspective view of the embodiment of Fig. 6.

In the embodiment of Figs. 6 and 7, head 21 is shown as square in shape and comprises the two layers 23 and 24, layer 23 being a contact material such as gold, silver, platinum, palladium etc., and layer 24 being a supporting layer of some base metal of good electrical conductivity such as copper, bronze, brass, etc. (Of course, it is within the scope of this invention that the shank material may also be of precious or semi-precious material such as silver, gold, platinum, palladium, etc., if such is desired.) Shank 22 is shown as square in cross section, and again consists of the tube portion 25 enclosing a core of solder 26. End 27 of shank 22 is cut off at the desired angle to the axis of the wire, and the cut surface is made smooth enough so that when end 27 is abutted to the under surface of layer 24 and the assembly is heated to the proper temperature to melt solder 26, capillary action will cause the solder to flow outwardly to fill the interspace as heretofore described. Fillet 28 will again probably form, the solder ceasing to flow when this has happened.

In regard to the degree of flatness required at end 7, or the under surface 4 of head 1, these do not have to be absolutely flat. Either can be slightly concave or convex, but the amount of concavity or convexity should not be so great as to afford such a large separation of the end 7 and surface 4 as to interfere with or prevent capillary action out to the perimeter of end 7. To enhance further the flowing of the molten solder in the interspace between surface 4 and end 7, it may be found advantageous to scratch the end 7 (or surface 4) to provide small grooves in which the solder can flow.

Figure 8:
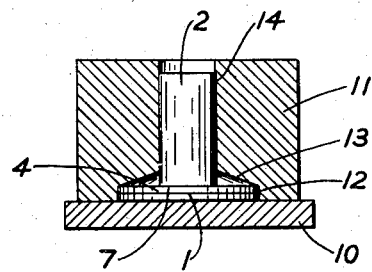
Fig. 8 is a cross-sectional view of the components of Fig. 1 assembled in a jig preparatory to heating.

In the heating operation, it will be found convenient to use a jig, such as is shown in Fig. 8, to guide the component parts of the contact relative to each other. A plate of metal 10, such as steel, is used as the base of the jig, and superimposed on it is the guide member 11 which may also be made of steel. A recess 12 corresponding in cross-sectional shape and in thickness to head 2 is milled in guide 11, and a solder clearance taper 13 is milled as shown. Hole 14 is drilled in guide 11 to receive shank 2. The component parts of the contact are assembled in the jig as shown, with shank 2 resting by its own weight on head 1 so that end 7 touches layer 4. Thereafter the assembly is heated until the solder flows as aforesaid.

As a specific example of a rivet-type contact made according to the present invention, a contact head 1 approximately .312 inch in diameter and .020 inch thick was selected, this head being two-layered, as shown, with layer 3 being fine silver .010 inch thick and layer 4 being a brass of the composition 92% copper, 7% zinc, 1% tin. These layers were first joined in ingot form, rolled to the .020 thickness, and then the composite heads 1 were blanked therefrom. The wire for shank 2 was likewise prepared in ingot form, and then drawn to have a diameter of approximately .187 inch, thereafter being cut into shanks of 0.4 inch. In the center of shank 2, the solder core was approximately .035 inch in diameter, and the solder comprised an alloy of 65% fine silver, 20% copper and 15% zinc. The heads and shanks were assembled in jigs as shown, and the jigs placed on a conveyor-belt type furnace, the belt moving approximately 24 inches per minute. The furnace was atmosphere controlled, containing semi-burned city gas (a mixture of carbon monoxide, carbon dioxide, hydrogen and nitrogen with traces of water vapor and other impurities) and the furnace temperature averaged 1320 to 1350° F. The heating zone of the furnace was approximately 8 feet long. This arrangement of parts and heating produced satisfactory contacts.

Throughout this specification and in the appended claims, the word soldering is used to mean any of the well-known methods of attaching one metal to another by means of a third metal of lower melting point than the other metals. By capillary action is meant the action of interfacial tensions that cause a liquid to creep along a surface.

In view of the above, it will be seen that the several objects of the invention are achieved and other advantageous results attained. As many changes could be made in carrying out the above constructions without departing from the scope of the invention, it is intended that all matter contained in the above description or shown in the accompanying drawings shall be interpreted as illustrative and not in a limiting sense.

I claim:

1. A composite electrical contact comprising a head and a body portion attached thereto by soldering, said body portion comprising a length of solder-filled wire having an internal core of solder.

2. A composite electrical contact comprising a head and a body portion attached thereto by soldering, said head comprising two or more layers of metal bonded together at their interfaces, and said body portion comprising a length of solder-filled wire having an internal core of solder.

3. A composite electrical contact comprising a head and a body portion attached thereto, said body portion carrying integrally within itself metallic means for attaching said body portion to the head, said means having a lower melting point than either the head or the body portion.

4. A composite electrical contact comprising a head and a body portion attached thereto, said body portion carrying integrally within itself substantially centrally located means for attaching said body portion to the head, said means having a lower melting point than either said head or said body portion.

5. A composite electrical contact comprising a head portion and a shank attached to one face thereof by an intervening layer of solder, said shank having a central bore throughout its length at least partially filled with solder to provide a self-contained source for the solder of said layer.

6. An electrical contact assembly comprising a head portion and a body portion to be attached thereto by soldering, and means carried integrally within said body portion for introducing solder into the joint to be soldered solely within the confines of the edges of said joint, the spacing between said head portion and said body portion being relatively small, whereby solder is caused to flow by interfacial tensions outwardly from within the confines of said edges upon heating the solder to its flowing temperature.

GEORGE A. MATTESON, Jr.

REFERENCES CITED

The following references are of record in the file of this patent:

UNITED STATES PATENTS

| Number | Name | Date |
|---|---|---|
| 243,766 | Feeley | July 5, 1881 |
| 997,420 | Seng | July 11, 1911 |
| 1,181,742 | Coolidge | May 2, 1916 |
| 1,287,031 | Johnson | Dec. 10, 1918 |
| 1,465,553 | Kirk | Aug. 21, 1923 |
| 1,469,043 | Laise et al. | Sept. 25, 1923 |
| 1,980,890 | Thompkins | Nov. 13, 1934 |
| 2,263,166 | Darvie | Nov. 18, 1941 |
| 2,354,409 | Strasser | July 25, 1944 |
| 2,365,249 | Comstock | Dec. 19, 1944 |
| 2,464,591 | Larsen | Mar. 15, 1949 |